(12) United States Patent
Berstis et al.

(10) Patent No.: US 7,876,889 B2
(45) Date of Patent: Jan. 25, 2011

(54) AUTOMATED CALLING SYSTEM FOR CONFERENCE CALLS

(75) Inventors: Viktors Berstis, Austin, TX (US); Randolph Michael Forlenza, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1255 days.

(21) Appl. No.: 11/425,102

(22) Filed: Jun. 19, 2006

(65) Prior Publication Data

US 2007/0291917 A1 Dec. 20, 2007

(51) Int. Cl.
*H04M 3/42* (2006.01)

(52) U.S. Cl. .................. 379/202.01; 379/158

(58) Field of Classification Search ........... 379/202.01, 379/158, 207.01
See application file for complete search history.

(56) References Cited

U.S. PATENT DOCUMENTS

| | | | | |
|---|---|---|---|---|
| 5,909,487 A * | 6/1999 | Mainker | ............... | 379/209.01 |
| 6,212,268 B1 * | 4/2001 | Nielsen | ............... | 379/210.01 |
| 6,577,622 B1 | 6/2003 | Schuster et al. | ............. | 370/352 |
| 6,760,324 B1 | 7/2004 | Scott et al. | ................. | 370/352 |
| 6,970,474 B1 | 11/2005 | Sinha | ........................ | 370/401 |
| 7,251,320 B1 * | 7/2007 | Todd | ..................... | 379/202.01 |
| 7,580,374 B1 * | 8/2009 | Gilbert | ....................... | 370/260 |
| 2005/0180406 A1 | 8/2005 | Sagiv | ......................... | 370/353 |
| 2005/0232253 A1 | 10/2005 | Ying et al. | ................. | 370/356 |
| 2005/0271001 A1 | 12/2005 | Thermond | ................. | 370/328 |
| 2007/0064898 A1 * | 3/2007 | Amano et al. | ............... | 379/168 |
| 2007/0121859 A1 * | 5/2007 | Smelyansky et al. | ........ | 379/158 |
| 2008/0049921 A1 * | 2/2008 | Davis et al. | ........... | 379/202.01 |

* cited by examiner

*Primary Examiner*—William J Deane
(74) *Attorney, Agent, or Firm*—David A. Mims, Jr.; William Steinberg; Robert V. Wilder

(57) ABSTRACT

A method and system are provided in which teleconference calls are scheduled in advance and, at an appropriate predetermined time, calls are automatically made to the designated participants of the conference calls thereby avoiding the need for the participants to call into a teleconference center. In a preferred embodiment, when teconferences are scheduled, the telecon participants are designated and their phone numbers are input or otherwise determined, for example, through access to a centralized database. A calendar is monitored and at a predetermined time relative to the scheduled start of the telecon, a server system application initiates the calling of the participants for connection to the telecon. The system may be configured to require participants to enter a password before the connection is completed. The status of the called participants is determined and displayed on individual display devices of the other participants in the telecon. In one example, designated participants are called back at selected intervals if the initial automated call is unanswered.

4 Claims, 4 Drawing Sheets

AUTOMATED CALLING SYSTEM FOR CONFERENCE CALLS

FIELD OF THE INVENTION

The present invention relates generally to information processing systems and more particularly to a system and methodology for enabling automatic calling of participants for scheduled conference calls.

BACKGROUND OF THE INVENTION

Because the workday is often hectic, people rush from one activity to another. Consequently, they are often late dialing into teleconferences or "telecons". This problem is aggravated when they need to find the phone number within a calendar entry for the telecon to dial in. In their haste, it is not unusual for simple mistakes to be made, such as looking at the wrong calendar entry, mis-dialing the phone number, neglecting to dial a leading digit for external calls, misreading and entering the wrong passcode, etc.

These types of problems can exist no matter what type of communications devices are being utilized. For example, even utilizing a combination of teleconferencing and Instant Messaging through Voice over Internet Protocol or "VoIP", teleconference participants will continue to experience the difficulties described above.

Thus, there is a need for an improved teleconferencing system and methodology for enabling automatic set-up of teleconference calls to participants in scheduled teleconferences.

SUMMARY OF THE INVENTION

A method and system are provided in which teleconference calls are scheduled in advance and, at an appropriate predetermined time, calls are automatically made to the designated participants of the conference calls thereby avoiding the need for the participants to call into a teleconference center. In a preferred embodiment, when teconferences are scheduled, telecon participants are designated and their phone numbers are input or otherwise determined, for example, through access to a centralized database. A calendar is monitored and at a predetermined time relative to the scheduled start of the telecon, a server system application initiates the calling of the participants for connection to the telecon. The status of the called participants is determined and displayed on individual display devices of the other participants in the telecon. In one example, designated participants are called back at selected intervals if the initial automated call is unanswered.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
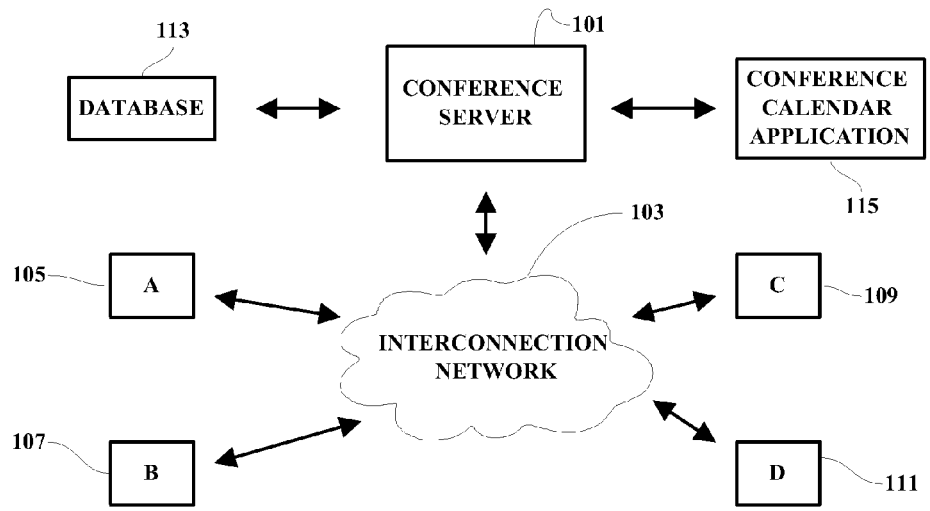
FIG. 1 is an overall system schematic illustrating an exemplary arrangement in which the present invention may be implemented.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

As herein disclosed, the present invention enables users to configure their VoIP support to provide automated 'dialing' to connect all participants to a telecon. VoIP support would connect to all participants based on information contained in an application calendar entry and the connection number information contained in centralized profiles, for example. The task of dialing into a telecon would be relegated to a centralized dial-in system. This functions by having the central system attempt to connect to all users rather than have the users dial in to a central number. This will not only be a valuable usability aid, it will also reduce the chance of user error. The person who schedules the VoIP teleconference would setup and send the meeting notice. In the meeting notice would be the names of the participants and a central number (e.g., 1-877-IBM-CONF) that continues to act as the focal point to the meeting. Normally, each user dials into a telecon by initially dialing into the telecon number and giving a passcode. The invention would move the tasks of dialing into a VoIP telecon away from each user and have the system call out to participants. Instead of each VoIP telecon participant manually dialing into the telecon, the system would use individual profiles of participants from one or more central directories or databases to determine or confirm the connection number of each participant and initiate a call to each participant. In an exemplary implementation, when the system first initiates the telecon call-out procedure, a popup would appear listing the names of each of the invited participants in a 'gray-out' format. As participants answered the call, their popup entry would changed from grayed to black (or some other configurable color) for a quick indication of their connected status. The status of those who have not answered (still grayed out) would be available in more detail by right clicking over the invitee's name. Doing so would present more detailed information concerning the called participant's status.

The system can be configured to continue attempting to connect. For example, retries can be configured to repeat continuously until the meeting is scheduled to end, retry 5 (more or less) times, retry every 6 minutes for 3 additional attempts, etc. Participants that could not respond at their profiled number could still call-in themselves using conventional methods. Passcodes could still be used to verify the identity of respondents.

With specific reference to the drawings, FIG. 1 illustrates a system in which the present invention may be implemented. As shown, a teleconference server or call center 101 is arranged to include or have access to a conference calendar application 115 which, in turn, is designed to receive and store input regarding a scheduled telecon and to initiate the conference call to the designated participants at the scheduled time. The server 101 also has access to one or more databases 113 for retrieving and/or confirming information, including phone numbers, of the designated participants. As is herein-after explained in greater detail, the conference server is enabled to initiate a scheduled conference call to designated participants through an interconnection network 103 such as, for example, the Internet. In accordance with the present invention, calls are automatically placed to participants A 105, B 107, C 109 and D 111 in the illustration. The devices used to participate in the teleconference may be personal computers, cell phones or any other device which has voice capabilities and is VoIP enabled. In one embodiment of the present invention, display capabilities are also utilized to enhance the functional features of the teleconferencing system disclosed herein.

Figure 2:
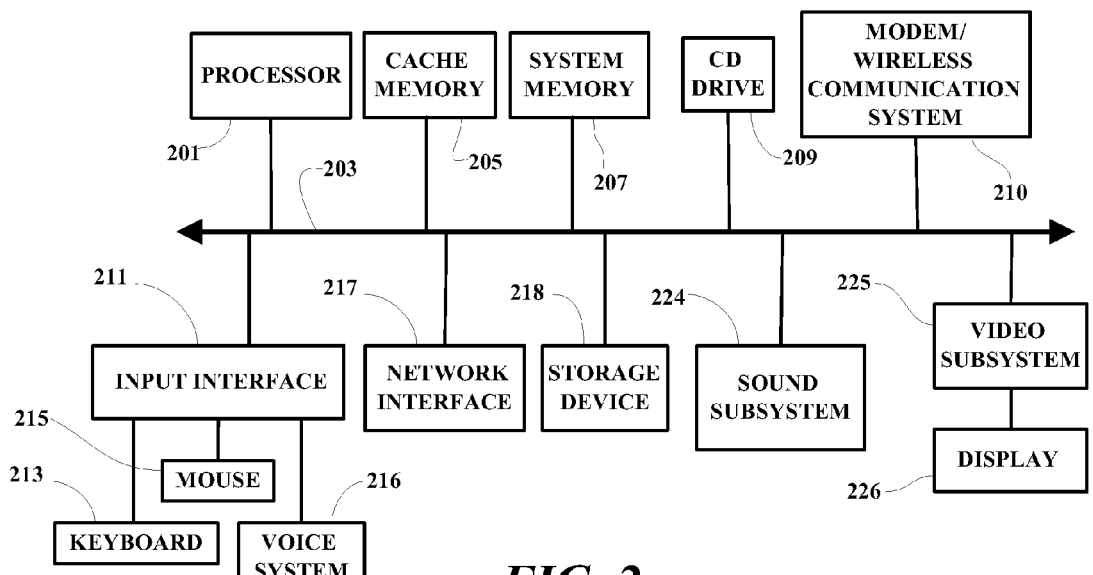
FIG. 2 is a schematic block diagram of several of the components of a user terminal device which may be used by a participant.

As shown in FIG. 2, an exemplary user teleconferencing device, e.g. 105, includes, inter alia, a processor 201 which is coupled to a main bus 203. Other components that are connected to the main bus 203 include a cache memory 205, and a system memory 207 which may be implemented with flash memory. The system also may include a CD drive 209 for example in a PC embodiment, and a modem or wireless communication system 210 capable of connecting to the conference server 101 through the interconnection network 103. The user device 105 also includes an input interface 211 for enabling user input from a keyboard or keypad 213, a mouse or pointer device 215 and/or a voice system 216 including a microphone for receiving voice input from the user. A network interface 217 is also connected to the main bus 203 along with a storage device 218 a sound subsystem 224 and a video subsystem 225 and associated display device 226. Other components and/or subsystems may also be connected to the main bus 203 as indicated by the extended bus sections.

Figure 3:
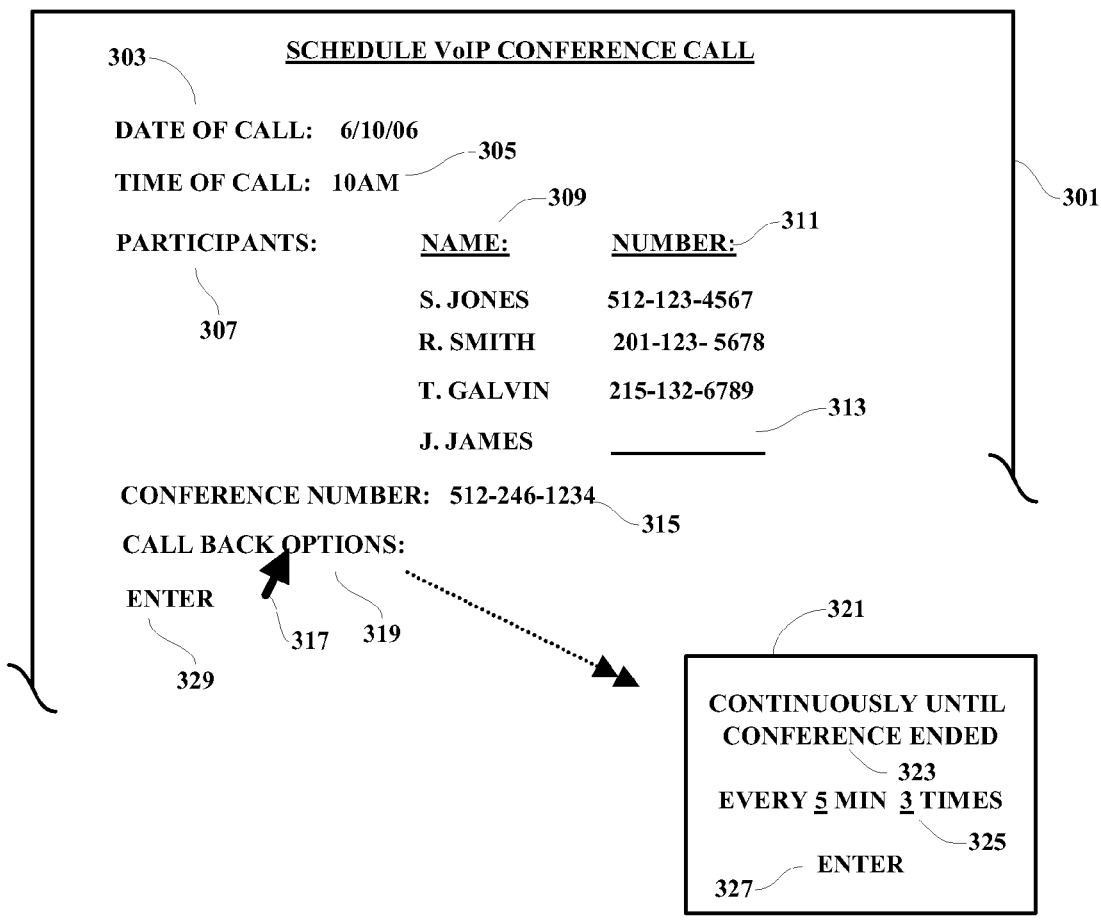
FIG. 3 is an example of an input display screen which may be used in scheduling teleconferences in accordance with the present invention.

In FIG. 3, there is shown an exemplary input display screen by which a user may schedule a teleconference to be set-up at the conference server 101. As shown, a display screen 301 is presented to a user and the user is enabled to input the date 303 of the proposed teleconference, the time 305 of the telecon, as well as the names of the participants 307 whom the user wishes to have participate in the scheduled telecon. The user is enabled to input specific names 309 as well as the participant's phone number 311. If a phone number is not known to the user or scheduler, the input line is left blank 313 and the system will access an appropriate database with the input name to determine the appropriate phone number and fill-in the phone number. The system may also be configured to present as a pop-up window on the scheduling screen, a listing of individuals names and numbers if the database check determines that there are more than one person with the input name, in order to enable the scheduler to positively select the desired participant. Also presented on the scheduling screen is the conference number 315 to be known by the designated participants. In one example, a password feature may also be included. With the password feature, the system will dial and connect to the participants, but will not allow a voice connection until the correct password is entered and verified. The conference number should be known to the participants in case they will not be at their designated phone at the time of the scheduled call. Participant call-back options 319 are also presented to the scheduler for use in designating further actions in the event the designated participant does not respond to the automated teleconference set-up call. The scheduler may point-and-click 317 on the CALL BACK OPTIONS text 319 to have a pop-up window 321 appear. The scheduler may then select from several options which may be presented including an option 323 to continuously call back a designated participant for the full duration of the scheduled conference call if the scheduled participant does not respond to the conference set-up call from the server 101. Another option 325 would designate that the un-responding participant is to be called-back every 5 minutes for three times, for example. When the scheduler has made his selections, an ENTER button 327 will input the call-back selections made by the scheduler. A subsequent selection of an ENTER text 329 will enter all of the information input by the scheduler for subsequent automatic implementation at the time the conference call is to occur. The system may be configured to begin to make the conference call connections a certain number of minutes prior to the scheduled time of the conference so that all of the participants will be on line or connected when the telecon is to begin.

Figure 4:
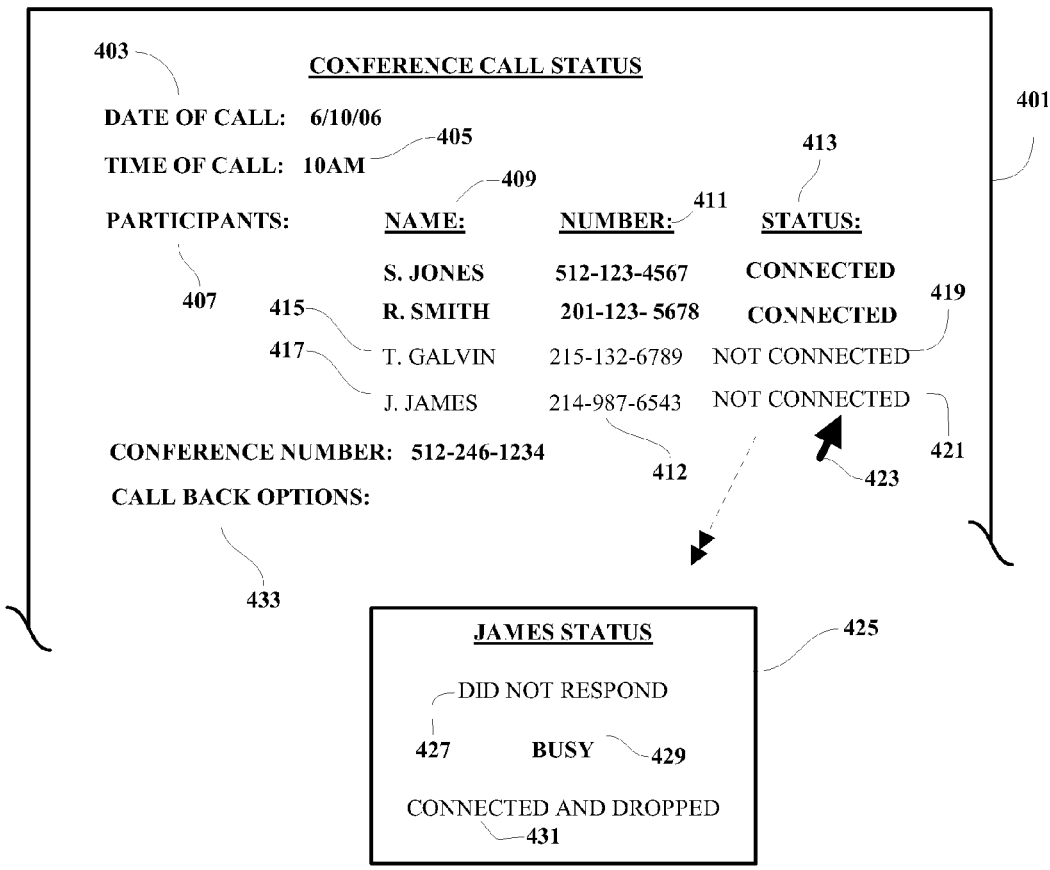
FIG. 4 is an example of a status display screen which may be used in association with the present invention.

At the designated date 303 and time 305, the server is programmed to make the calls to the designated teleconference participants 309. At that time, a status screen 401, as shown in FIG. 4, is displayed to all connected participants as they are connected to the call. The status screen 401, in the example, includes the date 403, time 405 and designated participants 407 to the call in name, number and status columns 409, 411 and 413. As shown, the missing phone number 313 in the set-screen 301 has been located in the database 113 by the program and filled-into the status screen 412. In the FIG. 4 example, Galvin 415 and James 417 are not yet connected and their names are displayed in light text as well as being noted as "NOT CONNECTED" 419 and 421, respectively. Also in the example, since Jones and Smith have been connected, the status column corresponding to their names shows a "CONNECTED" status and their names are emboldened on the status screen. A user is enable to point-and-click 423 on the "NON-CONNECTED" text 421 in order to have a pop-up screen 425 appear to present more information regarding the reason for the unconnected status of the designated participant. As shown, possible reasons include that there was no answer 427, or the line was busy 429 or that the call was connected but later dropped for some reason 431. The connected participants are also enabled to change the call back options 433 from the status screen by pointing-and-clicking on the CALL BACK OPTIONS text 433 as discussed in connection with FIG. 3. Once a designated participant has been connected, the corresponding light text will become emboldened to visually indicate the connected status of the participant.

Figure 5:
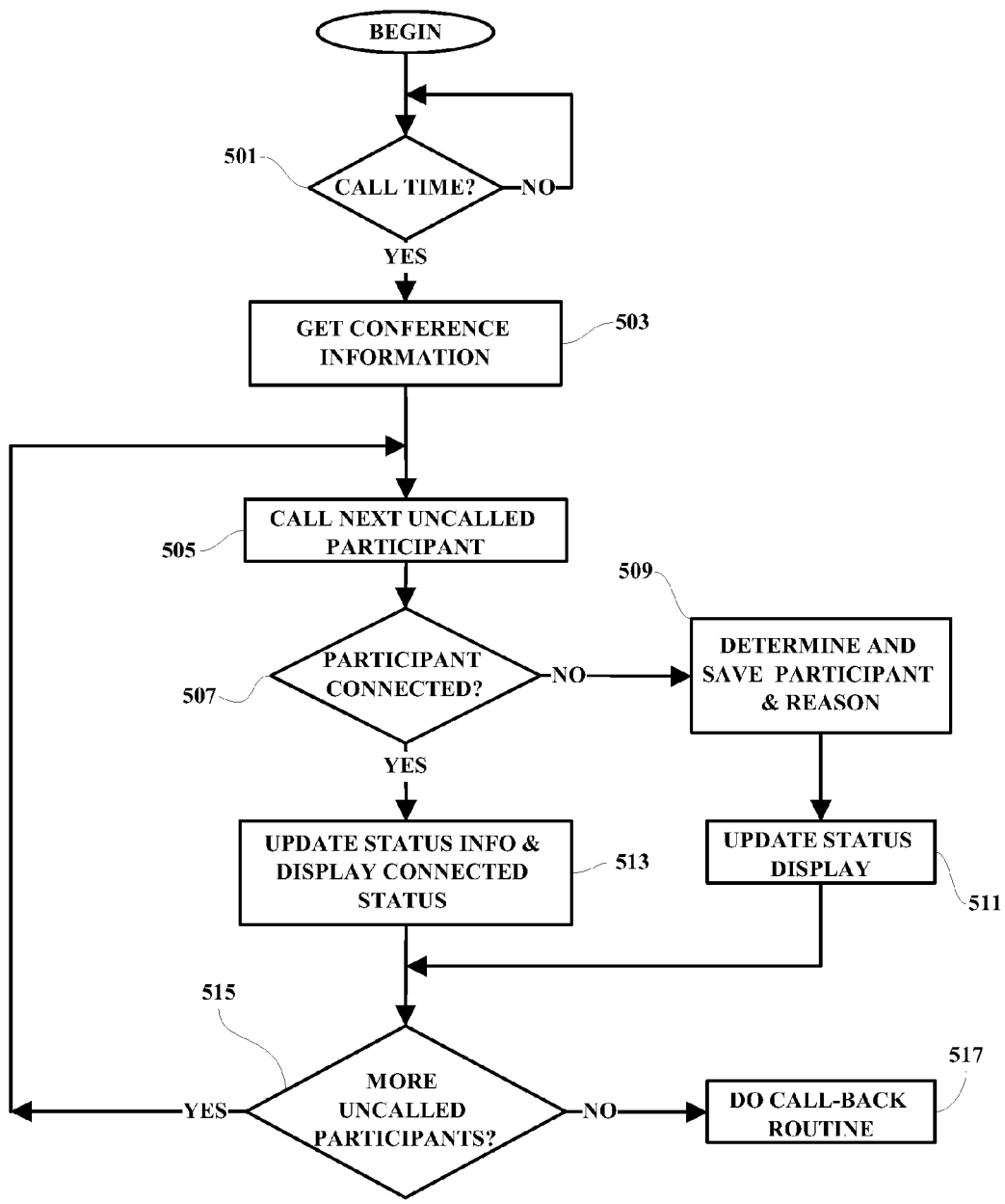
FIG. 5 is a flow chart illustrating an exemplary functional sequence in one implementation of the present invention.

A functional sequence of the methodology of an exemplary embodiment of the present invention is shown in FIG. 5. As shown, when it is determined by the conference server 101 and conference calendar application 115 that a scheduled teleconference is to begin 501, the server 101 retrieves the conference information 503 and initiates calls 505 to the designated participants. If a called participant does not connect 507, the reason for the non-connect is determined and saved 509 and all active status displays are updated 511 to indicate that a connection has not been made. The next uncalled participant is then called 505. When a participant is connected 507, the status information is updated 513 and if the participant has a display, the updated status information screen 401 is displayed on the connected participant's display screen. If there are more uncalled participants 515 the next participant is called 505 by the server 101 until all of the designated participants have been called. When there are no more uncalled designated participants 515, the process goes to implement the input call-back programming 517 as determined by default or by the scheduler, e.g. 321.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), memory stick or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for calling participants in a conference call, said method comprising:

inputting a conference date and call time for said conference call into a computer system;

inputting names of said participants into said computer system; and providing telephone numbers for said participants, said computer system being operable to automatically initiate computer-originated calls to said participants on said conference date at said call time for connecting said participants together for said conference call, said computer system including a user computing device wherein said user computing device includes a display device for displaying information to a user, said method further including enabling said user to pre-set call-back preferences before said conference call is initiated for implementation by said computer system if one or more of said participants is not initially connected to said conference call in response to said computer-originated call, said call-back preferences including a designation of a user-selectable call-back frequency with which each non-answering participant is called back, said user computing device being further enabled after said conference call is initiated for displaying a connection status screen showing a connection status for each of said participants, said connection status screen further including a call-back option selection item, said call-back selection item being selectable by said user during said conference call to change said call-back frequency which was pre-set before said conference call was initiated.

2. The method as set forth in claim 1 wherein said connection status screen is configured to receive a user input by which said user is enabled to make a selection to request a reason why a selected non-connected participant is not connected in said conference call, said computer system being responsive to said request for providing a display of detailed reasons why said selected non-connected participant is not connected in said conference call.

3. The method as set forth in claim 2 wherein said computer system is enabled to access a database to provide a listing of names similar to said names of said participants input by said user for said teleconference, said user being enabled to select specific ones of similar names as participants to said conference call.

4. A method for calling participants in a conference call, said method comprising:

inputting a conference date and call time for said conference call into a computer system;

inputting names of said participants into said computer system; and providing telephone numbers for said participants, said computer system being operable to automatically initiate computer-originated calls to said participants on said conference date at said call time for connecting said participants together for said conference call, said computer system including a user computing device wherein said user computing device includes a display device for displaying information to a user, said method further including enabling said user to pre-set call-back preferences, before said conference call is initiated, for implementation by said computer system if one or more of said participants is not initially connected to said conference call in response to said computer-originated call, said call-back preferences including a designation of a user-selectable call-back frequency with which each non-answering participant is called back, said system being operable in response to user input to enable a user selection of a different call-back frequency for different ones of said participants.

* * * * *